(12) United States Patent
Van Wyk

(10) Patent No.: US 9,924,242 B2
(45) Date of Patent: Mar. 20, 2018

(54) AUTOMATIC NETWORK TOPOLOGY DETECTION AND FRAUD DETECTION

(75) Inventor: Hartman Van Wyk, Montloius sur Loire (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 13/560,078

(22) Filed: Jul. 27, 2012

(65) Prior Publication Data

US 2013/0278437 A1    Oct. 24, 2013

Related U.S. Application Data

(63) Continuation of application No. PCT/US2012/034697, filed on Apr. 23, 2012.

(30) Foreign Application Priority Data

Apr. 20, 2012 (EP) .................................... 12165026

(51) Int. Cl.
*G08C 19/04* (2006.01)
*G08C 19/10* (2006.01)
(Continued)

(52) U.S. Cl.
CPC ........... *H04Q 9/00* (2013.01); *H04Q 2209/60* (2013.01)

(58) Field of Classification Search
None
See application file for complete search history.

(56) References Cited

U.S. PATENT DOCUMENTS

| 5,920,720 A | 7/1999 | Toutonghi et al. |
| 6,334,050 B1 | 12/2001 | Skarby |

(Continued)

FOREIGN PATENT DOCUMENTS

| DE | 102008044915 A1 | 3/2010 |
| DE | 102013106393 | 12/2013 |

(Continued)

OTHER PUBLICATIONS

Sharon et al., Topology Identification in Distribution Network with Limited Measurements, Jan. 16-20, 2012, Inovative Smart Grid Technology Conference, IEEE, 1-6.*

(Continued)

*Primary Examiner* — Firmin Backer
*Assistant Examiner* — Jerold Murphy
(74) *Attorney, Agent, or Firm* — Lee & Hayes, PLLC

(57) ABSTRACT

Given a node of a utility service distribution network, a topology of a subset of the distribution network having the given node as a root node and one or more child nodes branching from the given node is determined. The topology may be determined based on relationships or correlations of utility usage information between the given node and a plurality of potential nodes that are considered in the topology determination. Upon determining the topology associated with the given node, the determined topology may be used to detect fraud and leakage that may occur in the distribution network on a regular basis or upon request. If fraud or leakage is detected in the distribution network, the system may schedule a follow-up and/or field investigation to investigate and fix the fraud or the leakage in the distribution network.

20 Claims, 4 Drawing Sheets

(51) Int. Cl.

| | | |
|---|---|---|
| G08C 19/22 | (2006.01) | |
| H04Q 9/00 | (2006.01) | |
| G01R 25/00 | (2006.01) | |
| H03D 13/00 | (2006.01) | |
| G01R 23/12 | (2006.01) | |
| G01R 23/02 | (2006.01) | |
| G01R 19/00 | (2006.01) | |

(56) References Cited

U.S. PATENT DOCUMENTS

| | | |
|---|---|---|
| 6,456,097 B1 | 9/2002 | Sutherland |
| 7,272,518 B2 * | 9/2007 | Bickel .................. G01D 4/004 340/657 |
| 7,523,185 B1 | 4/2009 | Ng et al. |
| 7,583,197 B2 | 9/2009 | van Swaay |
| 8,094,010 B2 | 1/2012 | van Swaay |
| 8,283,911 B1 | 10/2012 | Bierer |
| 8,301,386 B1 | 10/2012 | Redmond et al. |
| 8,639,391 B1 | 1/2014 | Alberth, Jr. |
| 8,797,018 B2 | 8/2014 | Watkins et al. |
| 9,031,800 B2 | 5/2015 | Filippenko et al. |
| 9,230,429 B2 | 1/2016 | McKinley et al. |
| 2005/0063317 A1 | 3/2005 | Risberg et al. |
| 2005/0177646 A1 | 8/2005 | Kawano et al. |
| 2006/0167981 A1 | 7/2006 | Bansod et al. |
| 2007/0247331 A1 * | 10/2007 | Angelis et al. .......... 340/870.02 |
| 2008/0089390 A1 | 4/2008 | Picard |
| 2009/0045976 A1 * | 2/2009 | Zoldi et al. ............. 340/870.02 |
| 2009/0276170 A1 | 11/2009 | Bickel |
| 2009/0299660 A1 * | 12/2009 | Winter .................. G01D 4/002 702/51 |
| 2010/0002348 A1 | 1/2010 | Donolo et al. |
| 2010/0088431 A1 | 4/2010 | Oshins et al. |
| 2010/0134089 A1 * | 6/2010 | Uram .................. G01R 22/063 324/66 |
| 2010/0142447 A1 | 6/2010 | Schlicht et al. |
| 2011/0116387 A1 | 5/2011 | Beeco et al. |
| 2011/0122798 A1 * | 5/2011 | Hughes .................. G01D 4/004 370/254 |
| 2011/0126176 A1 | 5/2011 | Kandasamy et al. |
| 2011/0215945 A1 * | 9/2011 | Peleg et al. ............ 340/870.02 |
| 2012/0117392 A1 * | 5/2012 | Turicchi, Jr. ............ G06F 1/263 713/300 |
| 2012/0169300 A1 | 7/2012 | Rouaud et al. |
| 2012/0181974 A1 | 7/2012 | Kuniyosi et al. |
| 2012/0198037 A1 | 8/2012 | Shelby et al. |
| 2012/0229089 A1 | 9/2012 | Bemmel et al. |
| 2013/0024149 A1 * | 1/2013 | Nayar et al. ..................... 702/72 |
| 2013/0035885 A1 | 2/2013 | Sharon et al. |
| 2013/0076534 A1 | 3/2013 | Conant et al. |
| 2013/0101003 A1 | 4/2013 | Vedantham et al. |
| 2013/0110425 A1 | 5/2013 | Sharma et al. |
| 2013/0241746 A1 | 9/2013 | McKinley et al. |
| 2013/0242867 A1 | 9/2013 | Bell |
| 2013/0275736 A1 | 10/2013 | Kelley et al. |
| 2013/0335062 A1 | 12/2013 | De Buda et al. |
| 2014/0005964 A1 | 1/2014 | Rouaud et al. |
| 2014/0012524 A1 | 1/2014 | Flammer, III |
| 2014/0032506 A1 | 1/2014 | Hoey et al. |
| 2014/0039818 A1 | 2/2014 | Arya et al. |
| 2014/0049109 A1 | 2/2014 | Kearns et al. |
| 2014/0161114 A1 | 6/2014 | Shuey |
| 2014/0173600 A1 | 6/2014 | Ramakrishnan Nair |
| 2014/0214218 A1 | 7/2014 | Eldridge et al. |
| 2014/0330955 A1 | 11/2014 | Bishop et al. |
| 2014/0337429 A1 | 11/2014 | Asenjo et al. |
| 2015/0052088 A1 | 2/2015 | Arya et al. |
| 2015/0103672 A1 | 4/2015 | Stuart |
| 2015/0241482 A1 | 8/2015 | Sonderegger |
| 2015/0241488 A1 | 8/2015 | Sonderegger |
| 2015/0280782 A1 | 10/2015 | Airbinger et al. |
| 2016/0109491 A1 | 4/2016 | Kann |
| 2016/0109497 A1 | 4/2016 | Aiello et al. |
| 2016/0142514 A1 | 5/2016 | Stuber et al. |
| 2016/0154040 A1 | 6/2016 | Driscoll et al. |
| 2016/0173237 A1 | 6/2016 | Braun et al. |
| 2016/0352103 A1 | 12/2016 | Aiello et al. |
| 2017/0168098 A1 | 6/2017 | Aiello et al. |

FOREIGN PATENT DOCUMENTS

| | | |
|---|---|---|
| EP | 1460801 A1 | 9/2004 |
| GB | 2426596 | 11/2006 |
| GB | 2426596 A | 11/2006 |
| JP | 06273200 A | 9/1994 |
| JP | 2000175358 A | 6/2000 |
| JP | 2000249730 A | 9/2000 |
| JP | 2004340767 A | 12/2004 |
| JP | 2012016270 A | 1/2012 |
| JP | 2012058233 A | 3/2012 |
| JP | 2012521596 A | 9/2012 |
| JP | 2014079138 A | 5/2014 |
| JP | 2015076994 A | 4/2015 |
| JP | 2015107012 A | 6/2015 |
| WO | WO2007063180 | 6/2007 |
| WO | WO2007063180 A1 | 6/2007 |
| WO | WO2009061291 | 5/2009 |
| WO | WO2010105038 | 9/2010 |
| WO | WO2010110787 | 9/2010 |
| WO | WO2010110787 A1 | 9/2010 |
| WO | 2014124318 A1 | 8/2014 |

OTHER PUBLICATIONS

The PCT Search Report mailed Jan. 31, 2013 for PCT application No. PCT/US12/34697, 9 pages.

The Extended European Search Report mailed Sep. 6, 2012 for European patent application No. 12165026.1, 6 pages.

Translated Japanese Office Action mailed Apr. 22, 2014 for Japanese patent application No. 2014-511377, a counterpart foreign application of U.S. Appl. No. 13/560,078, 6 pages.

Translated Japanese Office Action mailed Oct. 28, 2014 for Japanese patent application No. 2014-511377, a counterpart foreign application of U.S. Appl. No. 13/560,078, 5 pages.

Hughes, "Augmenting AMI to Radically Reduce Electricity Theft", Metering International, Issue 1, Jan. 1, 2011, pp. 80-83, retrieved from the internet on May 20, 2015 at http://www.metering.com/wp-content/uploads/2013/10/MI-1-2-11.pdf, 116 pages.

Final Office Action for U.S. Appl. No. 13/560,078, mailed on Jul. 1, 2015, Hartman Van Wyk, "Automatic Network Topology Detection and Fraud Detection", 23 pages.

PCT Search Report and Written Opinion mailed Oct. 20, 2015 for PCT Application No. PCT/US15/44191, 11 pages.

PCT Search Report and Written Opinion mailed May 22, 2015 for PCT application No. PCT/US2015/017571, 9 pages.

PCT Search Report and Written Opinion mailed Jun. 1, 2015 for PCT Application No. PCT/US2015/017575, 12 pages.

Short, "Advanced Metering for Phase Identification, Transformer Identification, and Secondary Modeling", IEEE Transactions on Smart Grid, IEEE, USA, vol. 4, No. 2, Jun. 1, 2013, pp. 651-658.

International Search Report and Written Opinion mailed Feb. 18, 2016, for PCT Application No. PCT/US2015/063512, 13 pages.

International Search Report and Written Opinion mailed Jan. 28, 2016, for PCT Application No. PCT/US2015/056482, 10 pages.

Non-Final Office Action mailed Feb. 16, 2016, for U.S. Appl. No. 14/280,286, 20 pages.

"Health Device Profile," Medical Devices WG, Internet citation, Jun. 26, 2008, pp. 1-44, retrieved on Nov. 9, 2015, at <https://www.bluetooth.org/docman/handlers/DownloadDoc.ashx?doc_id=260864&vid=290095&_ga=1.128761092.961309788.1447059724>.

"Open Smart Grid Protocol (OSGP); draft ETSI GS OSG 001," European Telecommunications Standards Institute (ETSI), France, vol. zArchive-ISG, No. V0.1.2, Sep. 2011, pp. 1-250, retrieved on Nov. 15, 2011.

International Search Report and Written Opinion mailed Mar. 2, 2016, for PCT Application No. PCT/US2015/061390, 15 pages.

(56) References Cited

OTHER PUBLICATIONS

Do, et al., "Open-Source Testing Tools for Smart Grid Communication Network," 2013 IEEE Conference on Open Systems (ICOS), Dec. 2-4, 2013, Sarawak, Malaysia, pp. 156-161, retrieved Feb. 7, 2014.
Madden, et al., "TinyDB: An Acquisitional Query Processing System for Sensor Networks," ACM Transactions on Database Systems, vol. 30, No. 1, Mar. 2005, pp. 122-173.
Maqousi, et al., "Towards an Open Architecture for Smart Grid Communications: Possible Pointers from Multiservice Network Research," 2013 1st International Conference & Exhibition on the Applications of Information Technology to Renewable Energy Processes and Systems, IEEE, May 29-31, 2013, Amman, Jordan, pp. 114-118.
Australian Examination Report dated Apr. 28, 2016, for Australian Patent Application No. 2012377368, a counterpart application of U.S. Appl. No. 13/560,078, 3 pages.
Communication pursuant to Article 94(3) EPC dated Jul. 29, 2016, for EP Application No. 12165026.1, a aounterpart application of U.S. Appl. No. 13/560,078, 6 pages.
Final Office Action dated Aug. 4, 2016, for U.S. Appl. No. 14/280,286, 20 pages.
Non-Final Office Action dated Jul. 29, 2016, for U.S. Appl. No. 14/547,561, 34 pages.
International Search Report and Written Opinion for PCT Application No. PCT/US2016/030144, dated Jul. 7, 2016, 12 pages.
Moritz, et al., "A CoAP based SOAP Transport Binding," IEEE FTFA 2011, Copyright IEEE, 2011, 4 pages.
Regehr, et al., "TinyOS 2.1 Adding Threads and Memory Protection to TinyOS," In Proceedings of the 6th ACM Conference on Embedded Network Sensor Systems (SenSys '08), Nov. 5-7, 2008, Raleigh, NC, pp. 413-414.
Snell, "Call SOAP Web Services with Ajax, Part 1: Build the Web Services Client," IBM Developer Works, Oct. 11, 2005, Copyright IBM Corp. 2005, pp. 1-13.
Canadian Office Action dated Oct. 26, 2016, for Canadian Patent Application No. 2,863,596, 3 pages.
Notice of Allowance dated Oct. 4, 2016, for U.S. Appl. No. 14/531,845, 9 pages.
Australian Office Action dated Mar. 17, 2017 for Australian Patent Application No. 2015223145, a foreign application of U.S. Appl. No. 14/280,286, 4 pages.
Australian Office Action dated Aug. 23, 2017 for Australian Patent Application No. 2015223053, a foreign application of U.S. Appl. No. 14/302,617, 10 pages.
Handley, et al., "ComEd Corrects Meter-Transformer Mismatches" ComEd Paper, Sep. 7, 2016, 8 pages.
Japanese Office Action dated Aug. 29, 2017 for Japanese Patent Application No. 2016-553886, a foreign application of U.S. Appl. No. 14/302,617, 17 pages.
Japanese Office Action dated Sep. 12, 2017 for Japanese patent application No. 2016-553860, a foreign application of U.S. Appl. No. 14/280,286, 9 pages.
Keisuke Sugiura, Mitsubishi Electric Research Laboratories, "Information Processing Society of Japan," 2013, pp. 4-513-4-514.
Office action for U.S. Appl. No. 14/280,286, dated Mar. 17, 2017, Sonderegger, "Smart Grid Topology Estimator,"13 pages.
Office Action for U.S. Appl. No. 14/518,564, dated Jul. 20, 2017, Kann, "Grid Topology Mapping Voltage Data," 18 pages.
Office action for U.S. Appl. No. 14/280,286, dated Aug. 11, 2017, Sonderegger, "Smart Grid Topology," 15 pages.
Notice of Allowance dated Feb. 6, 2017, for U.S. Appl. No. 14/547,561, 22 pages.
Berthier, et al., "Intrusion Detection for Advanced Metering Infrastructures: Requirements and Architectural Directions," In Smart Grid Communications (SmartGridComm) 2010, First IEEE International Conference on Smart Grid Communications, Oct. 4, 2010, Gaithersburg, Maryland, IEEE, pp. 350-355.
Final Office Action for U.S. Appl. No. 13/560,078, dated Jul. 1, 2015, Hartman Van Wyk, "Automatic Topology Detection and Fraud Detection," 23 pages.
PCT Search Report and Written Opinion dated May 22, 2015 for PCT application No. PCT/US2015/017571, 9 pages.
PCT Search Report and Written Opinion dated Jun. 1, 2015 for PCT Application No. PCT/US2015/017575, 12 pages.
Short, "Advanced Metering for Phase Identification, Transformer Identification, and Secondary Modeling," IEEE on Smart Grid, IEEE, USA, vol. 4, No. 2, Jun. 1, 2013, pp. 651-658.

\* cited by examiner

AUTOMATIC NETWORK TOPOLOGY DETECTION AND FRAUD DETECTION

RELATED APPLICATION

This application is a continuation of PCT International Application No. PCT/US12/34697, filed Apr. 23, 2012, which claims priority to European Application No. 12165026.1, filed on Apr. 20, 2012, and entitled "Automatic electric network topology detection and instantaneous fraud detection," both of which are incorporated herein by reference.

BACKGROUND

With the rapid expansion of metropolitan cities and the expansive growth of population, distribution networks for utilities such as electricity, gas and water, etc., have become unprecedentedly complicated. New metering devices, such as electricity meters, are added to the distribution networks to serve new areas and/or replace obsolete metering devices, while outdated metering devices are removed from the distribution networks. Given the tremendous number of metering devices in the distribution networks and the dynamics of the distribution networks, utility service providers find it impractical, if not impossible, to determine the topologies associated with the distribution networks, i.e., which metering device is connected to which junction node (e.g., a transformer in electricity service, etc.), for example.

Furthermore, without an accurate and up-to-date knowledge of the topologies of the distribution networks, the utility service providers may overlook fraud and/or leakage that occurs in the networks, thereby incurring losses to the utility service providers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
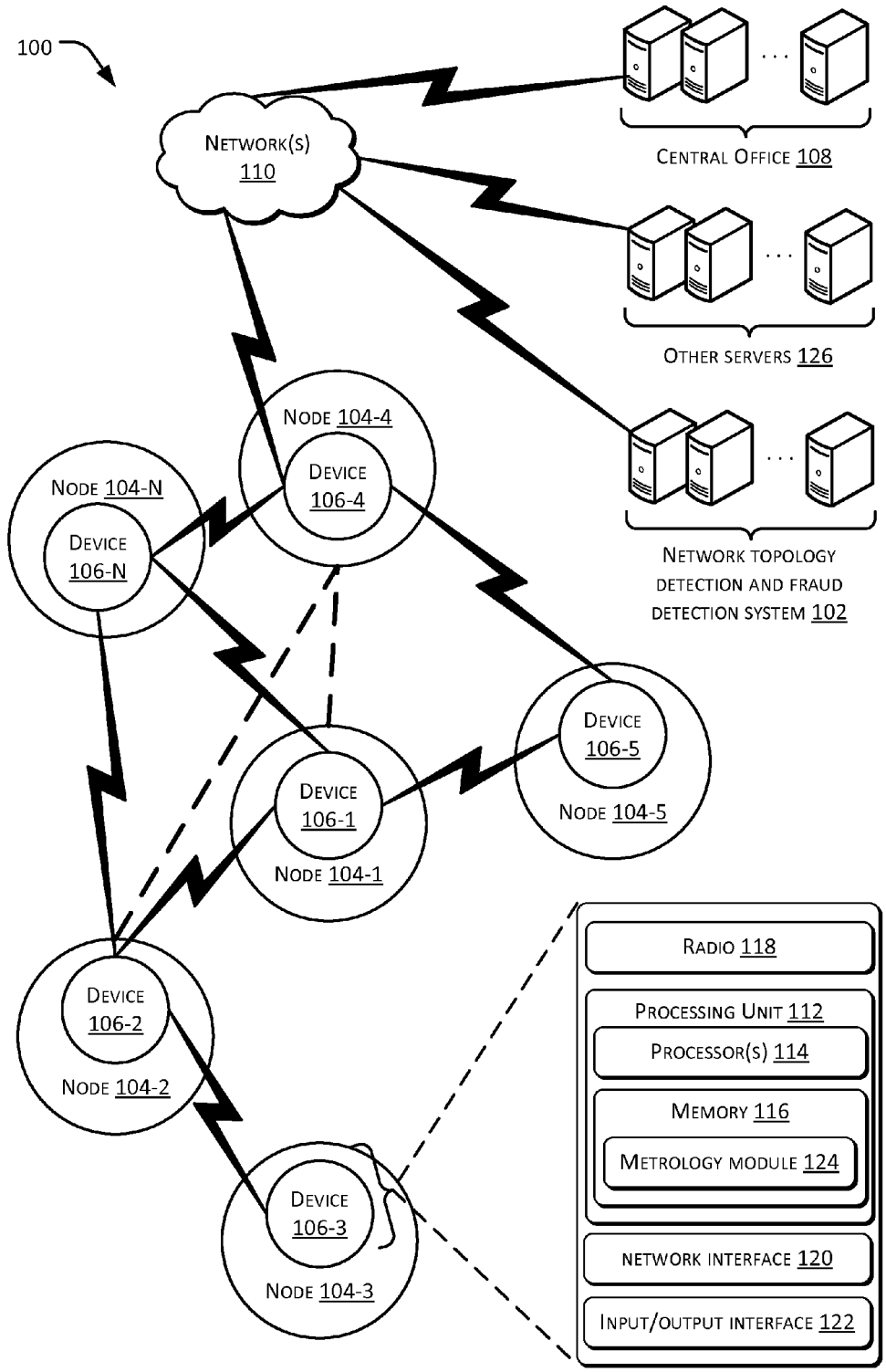
FIG. 1 illustrates an example environment usable to implement an example network topology detection and fraud detection system.

As noted above, existing utility service providers find it impractical, if not impossible, to determine topologies associated with distribution networks for providing utility services. Furthermore, without an accurate and up-to-date knowledge of the topologies of the distribution networks, determination of fraud and/or leakage in the networks is prone to errors and erroneously reports false positives and false negatives, thus causing a waste of resources to investigate these false positives and false negatives.

This disclosure describes a network topology detection and fraud detection system. The system enables automated detection of a topology of a network associated with a given node (i.e., detection of a topology of a network with the given node as a root node of the network). For example, given a node, the system allows determination of one or more child nodes that are immediately connected to the given node.

Generally, the system may be triggered to determine or select a node for which topology information is desired. The system may be triggered by occurrence of an event or condition (event-driven) or upon request of a user (user-driven). As an example of an event-driven trigger, the system may detect abnormal activities (such as significant changes in consumption of a utility service associated with the distribution network, etc.) in a node of the distribution network and may select that node for which topology information is to be determined. As an example of a user-driven trigger, the system may allow a user to select a node for which topology information is desired. Additionally or alternatively, the system may receive a request to determine a topology of a given node. Additionally or alternatively, the system may select a node for which topology information is to be determined on a regular basis, for example, every one week, every one month, etc. In one implementation, the selected node may be used as a root node for which the topology information is determined. In other implementations, the selected or given node may include an intermediate node of a distribution network through which a utility service (e.g., electricity, gas or water, etc.) is transmitted from a utility station of a service provider to a node where the utility service is consumed (e.g., a customer node). By way of example and not limitation, the selected node may include, a junction node, such as a transformer node or a substation node for electricity service, for example.

In response to receiving a selected or given node, the system may explore utility usage information received from metering devices associated with (or included in) a plurality of other nodes, and determine which one or more nodes are immediately connected to the selected node, or which one or more nodes to which the selected node delivers the utility service. In one implementation, the system may determine a topology associated with the selected node by comparing the utility usage information received from the plurality of nodes (or the metering devices associated therewith) with utility usage information recorded at the selected node.

In one implementation, the utility usage information of a node may include changes in usage values of the utility service recorded at a metering device associated with (or included in) the node at a regular time interval or at respective times of change in electricity usage, for example. Additionally or alternatively, the utility usage information of a node may include only, for example, changes in usage values (that are greater than or equal to a predetermined threshold or percentage) of the utility service recorded at a metering device associated with (or included in) the node at a regular time interval or at respective times of change of electricity usage, for example, etc. In one implementation, the utility usage information of a node may further include respective time stamps of the changes in usage values of the utility service recorded at a metering device associated with (or included in) the node.

In one implementation, the system may compare the utility usage information received from the plurality of nodes with the utility usage information recorded at the selected node by computing correlations between the utility usage information of the plurality of nodes and the utility usage information of the selected node. Additionally or alternatively, in one implementation, the system may determine whether a correlation between the utility usage information of a node of the plurality of nodes and the utility usage information of the selected node is greater than or equal to a predetermined correlation threshold. If the correlation between the utility usage information of the node and the utility usage information of the selected node is greater than or equal to the predetermined correlation threshold, the system may determine that the node is connected to the selected node, or in other words, the node is a component or part of the topology of a network associated with the selected node. By determining that a plurality of nodes are connected to the selected node, the system therefore successfully determines the topology of the network associated with the selected node, i.e., the topology of the network including the selected node and the plurality of determined nodes with the selected node being a root node of the network.

In some implementations, given a determined topology or a previously known topology of a network having a given node as a root node, the system may further monitor and determine whether a discrepancy exists in utility usage data among one or more nodes in the network including the given node and a plurality of child nodes. In one implementation, the discrepancy may include, but is not limited to, a discrepancy due to fraud (e.g., by tampering with or bypassing a metering device associated with a child node) and/or leakage associated with the utility service in the network. In one implementation, the system may determine whether a change in the utility usage recorded at the given node is unattributable by any combination of changes of one or more utility usages of the plurality of child nodes. Additionally or alternatively, the system may determine whether a value of utility usage recorded at the given node is different from a sum of values of the utility usages received from the plurality of child nodes at a particular time or over a particular period of time.

In one implementation, the system may detect that fraud and/or leakage exists in the network. By way of example and not limitation, the system may detect that a change in a utility usage of a child node is unattributable by (or unable to be correlated with) any change in the utility usage recorded at the given node. Additionally or alternatively, the system may detect that a change in the utility usage recorded at the given node is unattributable by (or unable to be correlated with) any combination of utility usages of one or more of the plurality of child nodes. Additionally or alternatively, the system may detect that a difference exists between a sum of the utility usages of the plurality of child nodes and the utility usage recorded at the given node, and each change in the utility usages of the plurality of child nodes are attributable by (or able to be correlated with) a change in the utility usage recorded at the given node over one or more periods of time.

In response to detecting a fraud and/or a leakage, the system may report the detection of the fraud and/or the leakage in the network to a management system for subsequent processing, such as reporting the detection to a relevant person to follow up on the situation, locating the fraud and/or the leakage in the network, etc.

The described system allows determining a topology of a network having a given node as a root node based on determining relationships or correlations between utility usages of a plurality of nodes and utility usage recorded at the given node. The described system further enables detecting fraud and leakage in the network by comparing the utility usages associated with the plurality of nodes and the utility consumption recorded at the given node based on the determined topology and/or a previously known topology of the network. Through the described system, a utility service provider can easily detect potential fraud and leakage in a network automatically.

In the examples described herein, the system computes correlations between utility usage recorded at a given node and utility usages of a plurality of nodes, determines a topology of a network including the given node and some of the plurality of nodes (with the given node as a root node), monitors and detects frauds and/or leakages in the network. However, in other implementations, one or more other devices or services may perform some or all of these functions. For example, in one implementation, a device or service may compute correlations between utility usage recorded at a given node and utility usages of a plurality of nodes, while another device or service may determine a topology of a network based on the computed correlations, and yet another device or service may monitor and detect frauds and/or leakages in the network based on the determined topology.

The application describes multiple and varied embodiments and implementations. The following section describes an example environment that is suitable for practicing various implementations. Next, the application describes example systems, devices, and processes for implementing network topology detection and fraud detection.

Example Architecture

FIG. 1 is a schematic diagram of an example architecture 100 usable to implement a network topology detection and fraud detection system 102. The architecture 100 includes a plurality of nodes 104-1, 104-2, 104-3, 104-4, 104-5, . . . , 104-N (collectively referred to as nodes 104). In this example, N represents a number of nodes arranged in a network. In one implementation, the network may include a distribution network of utility services including, but not limited to, electricity, gas, water, etc. The plurality of nodes 104 are coupled to each other via utility service paths, such as electrical wiring paths, gas pipes, or water pipes, for example. In one implementation, these utility service paths may not be known (or may be partially known) to the network topology detection and fraud detection system 102 and/or a utility service provider of the distribution network due to dynamics and evolution of the distribution network over time. The plurality of nodes 104 may include, for example, nodes of customers of the utility service, nodes of junctions facilitating routing of the utility service to the customers, nodes of substations serving the utility service for a particular area, etc.

In some implementations, the plurality of nodes 104 may include or be associated with a plurality of devices 106-1, 106-2, 106-3, 106-4, 106-5, . . . , 106-M (collectively referred to as devices 106) communicatively coupled to each other via direct communication paths or "links." In this example, M represents a number of devices arranged in a communication network. In one implementation, the number of devices, M, may be the same as the number of nodes, N. In some implementations, the number of devices, M, may be greater or less than the number of nodes.

In one implementation, the communication network may include an autonomous routing area (ARA), such as a wide area network (WAN), metropolitan area network (MAN), local area network (LAN), neighborhood area network (NAN), personal area network (PAN), or the like. While only one ARA is shown in FIG. 1, in practice, multiple ARAs may exist and may collectively define a larger network, such as an advanced metering infrastructure (AMI) network.

As discussed above, the term "link" refers to a direct communication path between two devices (without passing through or being propagated by another device). The link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels.

In one implementation, some or all of the devices 106 may be implemented as any of a variety of conventional computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, combinations of the foregoing, or any device couplable to a communication network and capable of sending and/or receiving data.

In some implementations, some or all of the devices 106 may additionally or alternatively be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

In this example, the devices 106 may further be configured to communicate with a central office 108 via an edge device (e.g., cellular relay, cellular router, edge router, DODAG root, etc.) which serves as a connection point of the ARA to a backhaul network(s) 110, such as the Internet. In this illustrated example, the device 106-1 serves as a cellular relay to relay communications from the other devices 106-2-106-M of the ARA to and from the central office 108 via the network(s) 110.

In one implementation, some or all of the devices 106 may include a processing unit 112. The processing unit 112 may include one or more processor(s) 114 communicatively coupled to memory 116. The memory 116 may be configured to store one or more software and/or firmware modules, which are executable on the processor(s) 114 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions.

The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In one implementation, some or all of the devices 106 may additionally include a radio 118. The radio 118 comprises a radio frequency (RF) transceiver configured to transmit and/or receive RF signals via one or more of a plurality of channels/frequencies.

Additionally or alternatively, in some implementations, some or all of the devices 106 may include a network interface 120, and/or an input/output interface 122. The processing unit 112 may further be configured to receive and act on data from the network interface 120, received from the input/output interface 122, and/or stored in the memory 116. In some implementations, the memory 116 may also include a metrology module 124 configured to collect consumption data of one or more resources (e.g., electricity, water, natural gas, etc.), which may then be transmitted to one or more other devices 106 for eventual propagation to the central office 108 or other destination.

The network(s) 110, meanwhile, represents a backhaul network, which may itself comprise a wireless or a wired network, or a combination thereof. The network(s) 110 may be a collection of individual networks interconnected with each other and functioning as a single large network (e.g., the Internet or an intranet). Further, the individual networks may be wireless or wired networks, or a combination thereof.

The central office 108 may be implemented by one or more computing devices, such as servers, personal computers, laptop computers, routers, switches, etc. The one or more computing devices may be equipped with one or more processor(s) communicatively coupled to memory. In some examples, the central office 108 includes a centralized meter data management system that performs processing, analysis, storage, and/or management of data received from one or more of the devices 106. For instance, the central office 108 may process, analyze, store, and/or manage data obtained from a smart utility meter, sensor, control device, router, regulator, server, relay, switch, valve, and/or other devices. The central office 108 may additionally or alternatively include a network management system (NMS) for maintaining a registry of devices of the AMI network, device configuration settings, version information, and the like. Although the example of FIG. 1 illustrates the central office 108 in a single location, in some examples the central office may be distributed amongst multiple locations and/or may be eliminated entirely (e.g., in the case of a highly decentralized distributed computing platform).

In FIG. 1, the network topology detection and fraud detection system 102 is described to be separate from the central office 108 and the plurality of nodes 104 (or devices 106), and to communicate with the central office 108 and the plurality of devices 106 through the network(s) 110. In some implementations, the network topology detection and fraud detection system 102 may be included in the central office 108 and/or the plurality of nodes 104 (or devices 106). For example, the network topology detection and fraud detection system 102 may be included in the central office 108. In some implementations, a node 104 (such as a junction node or a substation node, for example) of the distribution network or a device 106 of the communication network may include the network topology detection and fraud detection system 102. In alternative implementations, functions of the network topology detection and fraud detection system 102 may be distributed amongst a plurality of nodes 104 (or devices 106) and/or the central office 108. In some implementations, the network topology detection and fraud detection system 102 may be included in servers 126 other than the central office 108.

In one implementation, the network topology detection and fraud detection system 102 is usable to determine a topology associated with part or all of the distribution network, and to detect fraud and leakage in the distribution network based on the determined (or previously known) topology of the distribution network or part of the distribution network.

Example Network Topology Detection

Figure 2:
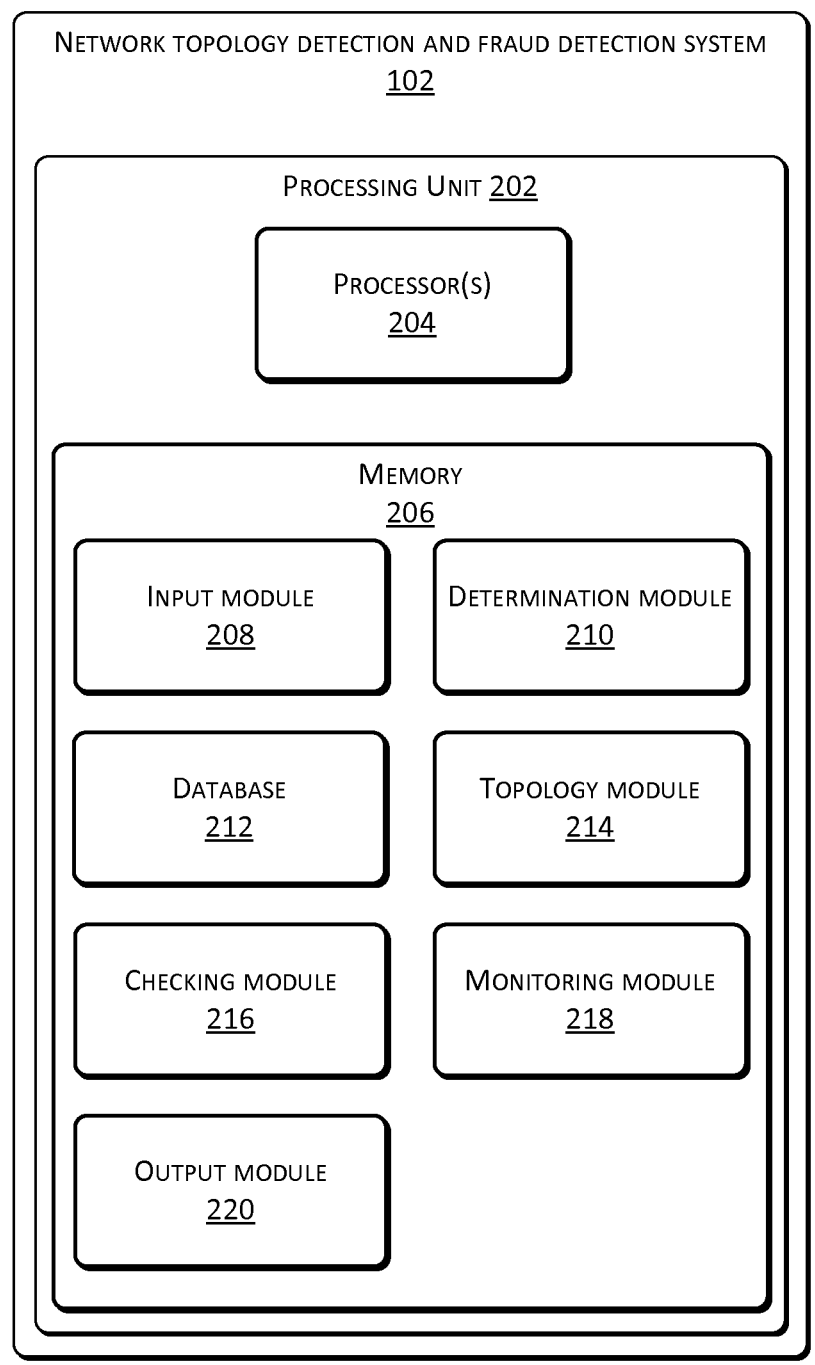
FIG. 2 illustrates the example network topology detection and fraud detection system of FIG. 1 in more detail.

FIG. 2 illustrates the example network topology detection and fraud detection system 102 in more detail. In one implementation, the network topology detection and fraud detection system 102 may include, but is not limited to, a processing unit 202. The processing unit 202 may include one or more processor(s) 204 communicatively coupled to memory 206. The memory 206 may be configured to store one or more software and/or firmware modules, which are executable on the processor(s) 204 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions. The memory 206 may comprise computer-readable media as defined in the foregoing description.

In one implementation, the network topology detection and fraud detection system 102 may include an input module 208 that receives an instruction or request from the central office 108 or a management or query system associated with the utility service, for example, to determine a network topology associated with a node 104 (such as the node 104-4, for example). Additionally or alternatively, the input module 208 may receive an instruction or request from the node 104 (or the device 106 associated with the node 104) to determine a network topology associated with the node 104.

In one implementation, the node 104 may include, for example, a junction node (such as a transformer node for electricity service), a substation node of the distribution network, etc. In some implementations, the network topology associated with the node 104 may include, but is not limited to, a downstream topology of a part of the utility service distribution network having the node 104 as a root node and including one or more immediate child nodes of the node 104 to which the utility service is delivered via the node 104. In one implementation, an immediate child node of a given node may include a node that is immediately connected to the given node and is a child node of the given node in the distribution network.

By way of example and not limitation, the node 104-4 in FIG. 1 may be used as a node given in the received instruction or request to illustrate operations of the network topology detection and fraud detection system 102. In one implementation, the network topology detection and fraud detection system 102 may include a determination module 210 to determine one or more nodes 104 of the distribution network of the utility service that may be considered as potential components of the network topology associated with the given node 104-4 that is to be determined.

In one implementation, the network topology detection and fraud detection system 102 may obtain location information of the nodes 104 of the distribution network to narrow down the number of nodes 104 to be considered for determining the network topology associated with the node 104-4, for example. By way of example and not limitation, the network topology detection and fraud detection system 102 may determine that nodes 104 having associated devices 106 belonging to a same and/or neighboring communication network(s) (e.g., a same and/or neighboring ARA network(s)) of the given node 104-4 are potential components of the network topology of the part of the distribution network that is associated with the node 104-4 to be determined.

Additionally or alternatively, in some implementations, the network topology detection and fraud detection system 102 may obtain information about respective physical areas (such as city, district, street, building, etc.) of the plurality of nodes 104 from a database 212 of the network topology detection and fraud detection system 102 or a database outside the network topology detection and fraud detection system 102. The network topology detection and fraud detection system 102 may determine that nodes 104 which belong to physical area(s) that is/are the same as or neighboring to a physical area of the node 104-4 are potential components of the network topology to be determined. In some implementations, the physical area of the node 104-4 may include one or more junction nodes and a plurality of customer nodes of the distribution network.

Additionally or alternatively, in one implementation, the distribution network may be divided into a number of grids. The network topology detection and fraud detection system 102 may obtain information of respective grids of the plurality of nodes 104 from the database 212 or a database outside the network topology detection and fraud detection system 102. In one implementation, the network topology detection and fraud detection system 102 may determine that nodes 104 which belong to grid(s) that is/are the same as and/or neighboring to a grid of the node 104-4 are potential components of the network topology to be determined. In some implementations, the grid of the node 104-4 may include one or more junction nodes and a plurality of customer nodes of the distribution network.

In one implementation, the input module 208 of the network topology detection and fraud detection system 102 may further receive utility service related information from the given node 104-4 and the plurality of considered nodes 104 (e.g., the nodes 104-1, 104-2, and 104-5, etc.) of the distribution network. Additionally or alternatively, the input module 208 of the network topology detection and fraud detection system 102 may receive the utility service related information from device 106-4 associated with (or included in) the given node 104-4 and devices 106 (e.g., the devices 106-1, 106-2, and 106-5, etc.) of the communication network that are associated with the plurality of considered nodes 104.

In one implementation, the utility service related information of a node 104 may include, but is not limited to, information of utility usage of the node 104 (e.g., a customer node), utility usage (or delivery) information through the node 104 (e.g., a junction node, a substation node, etc.), etc. The utility usage of the node 104 may be measured in terms of a physical quantity. Depending on the type of utility service considered, the physical quantity may include, but is not limited to, an electrical current usage, an electrical voltage usage or an electrical power usage (for electricity service), a volume of gas usage (for gas service) or a volume of water usage (for water service), etc.

In some implementations, the utility usage information of a node 104 (or a device 106 associated therewith) may include, but is not limited to, changes in usage values of the utility service recorded at the device 106 associated with (or included in) the node 104 at a regular time interval or at respective times of change. Additionally or alternatively, the utility usage of a node 104 (or a device 106 associated therewith) may include only, for example, changes (which are greater than or equal to a predetermined threshold or percentage) in usage values of the utility service recorded at the device 106 associated with (or included in) the node 104 at a regular time interval or at respective times of change, etc. Additionally or alternatively, the utility usage information of a node 104 (or a device 106 associated therewith) may include usage values of the utility service recorded at the device 106 associated with (or included in) the node 104 at a regular time interval. In one implementation, the utility usage information of a node 104 (or a device 106 associated therewith) may further include respective time stamps of the usage values and/or the changes in usage values of the utility service recorded at the device 106 associated with (or included in) the node 104.

In one implementation, the network topology detection and fraud detection system 102 may include a topology module 214 to determine which one(s) of the plurality of considered nodes 104 is/are part(s) of the topology of the part of the distribution network associated with the given node 104-4 that is to be determined. In one implementation, the topology module 214 may compare utility usage information of the plurality of considered nodes 104 with utility usage (or delivery) information of the given node 104-4 to determine which one(s) of the plurality of considered nodes 104 is/are part(s) of the network topology associated with the given node 104-4 to be determined.

By way of example and not limitation, the topology module 214 may apply a correlation function to compute correlations between respective utility usages of the plurality of considered nodes 104 and the utility usage of the given node 104-4. For example, the topology module 214 may employ a correlation function, such as a cross correlation function, to compute correlations between respective patterns of utility usages of the plurality of considered nodes 104 and a pattern of the utility usage of the given node 104-4 over one or more predetermined periods of time. In one implementation, the topology module 214 may compute correlations between respective changes (or patterns of changes) in usage values of the utility service of the plurality of considered nodes 104 and changes (or pattern(s) of changes) in usage values of the utility service of the given node 104-4 over one or more predetermined periods of time. Additionally or alternatively, in some implementations, the topology module 214 may compute correlations between respective usage values (or patterns of usage values) of the utility service of the plurality of considered nodes 104 and usage values (or pattern(s) of usage values) of the utility service of the over node 104-4 over one or more predetermined periods of time.

In one implementation, in response to computing the correlations between the utility usages of the plurality of considered nodes 104 and the utility usage of the given node 104-4, the network topology detection and fraud detection system 102 may compare the computed correlations with a predetermined correlation threshold. In one implementation, the network topology detection and fraud detection system 102 may determine that a considered node 104 is a component or part of the topology of the network associated with the given node 104-4 if a computed correlation between the considered node 104 (e.g., 104-1) and the given node 104-4 is greater than or equal to the predetermined correlation threshold.

In response to determining one or more considered nodes (e.g., the customer nodes 104-1 and 104-2) to be components or parts of the topology of the network associated with the given node 104-4, the network topology detection and fraud detection system 102 may successfully determine the topology of the network associated with the given node 104-4 to include the customer nodes 104-1 and 104-2, for example.

Alternatively, in some implementations, upon finding or determining one or more considered nodes 104 (e.g., the customer nodes 104-1 and 104-2) to be components or parts of the network topology associated with the given node 104-4, the network topology detection and fraud detection system 102 may further include a checking module 216 to check whether the network topology found or determined for the given node 104-4 is complete. For example, the checking module 216 may determine whether one or more customer nodes 104 that belong to the network topology associated with the given node 104-4 have not been considered by the network topology detection and fraud detection system 102. In one implementation, the checking module 216 may determine whether one or more customer nodes 104 have not previously been considered by comparing the utility usage information of the one or more found nodes 104 with the utility usage information of the given node 104-4.

By way of example and not limitation, the checking module 216 may compare a sum (or combination) of the utility usages (usage values or usage value changes) of the one or more nodes 104 (e.g., the customer nodes 104-1 and 104-2) found or determined by the topology module 214 with the utility usage of the given node 104-4 at one or more instants of time (or over one or more periods of time), and determine if they are the same. If they are the same, the checking module 216 may determine that the determined network topology is complete. If they are different, e.g., the sum of the utility usages of the one or more found nodes is less than the utility usage of the given node 104-4, the checking module 216 may determine that some nodes that belong to the network topology are missing.

In one implementation, in response to determining that some nodes that belong to the network topology are missing, the network topology detection and fraud detection system 102 may expand a scope of consideration. By way of example and not limitation, the checking module 216 may obtain information about one or more adjacent communication networks that have not been considered previously from, for example, the database 212 or other database outside the network topology detection and fraud detection system 102. The checking module 216 may consider nodes of these one or more adjacent communication networks for determining or finding missing nodes in this network topology detection associated with the given node 104-4. Additionally or alternatively, the checking module 216 may obtain information about one or more adjacent physical areas and/or grids that have not been considered previously from, for example, the database 212 or other database outside the network topology detection and fraud detection system 102.

In one implementation, the network topology detection and fraud detection system 102 may then repeat the foregoing operations of determining the network topology associated with the given node 104-4 until a complete topology is found. Additionally or alternatively, the network topology detection and fraud detection system 102 may then repeat the foregoing operations of determining the network topology associated with the given node 104-4 until a predetermined number of iterations for searching missing nodes is reached. Additionally or alternatively, the network topology detection and fraud detection system 102 may then repeat the foregoing operations of determining the network topology associated with the given node 104-4 until a current scope of consideration is greater than or equal to a reasonable scope associated with the given node. Additionally or alternatively, the network topology detection and fraud detection system 102 may then repeat the foregoing operations of determining the network topology associated with the given node 104-4 until an administrator temporarily terminates the operations to adjust values of parameters such as the predetermined correlation threshold, for example.

In one implementation, if the sum of the utility usages (e.g., values or value changes) of the one or more found nodes is different from the utility usage of the given node 104-4 and no missing node is found after a predetermined number of iterations, for example, the checking module 216 may determine that a fraud or leakage may exist in the network. In one implementation, the checking module 216 may notify a relevant person such as a system administrator or personnel of the central office 108, for example, to follow up on this observation of possible fraud and/or leakage in the network.

Example Fraud Detection

Given a successfully determined or previously known network topology associated with a node 104 (e.g., the junction node 104-4), the network topology detection and fraud detection system 102 may further be configured to detect fraud and leakage in (the part of) the distribution network associated with the node 104-4. In one implementation, the network topology detection and fraud detection system 102 may include a monitoring module 218 to monitor the distribution network and determine whether a fraud and/or a leakage occur(s) in the distribution network. In one implementation, the monitoring module 218 may determine whether a discrepancy exists in utility usage information among one or more nodes in the distribution network. The discrepancy may include, for example, a discrepancy due to a fraud and/or a leakage in the distribution network.

Continuing with the above example of using the junction node 104-4, in one implementation, the monitoring module 218 may determine whether a change in utility usage value of the junction node 104-4, for example, is unattributable by any combination of one or more changes in utility usage values of the nodes 104 included in the topology. Additionally or alternatively, the monitoring module 218 may determine whether a change in usage value of a node (e.g., the node 104-1) included in the topology is unattributable by any change in the usage value of the junction node 104-4. Additionally or alternatively, the monitoring module 218 may determine whether a difference exists between a value (such as utility usage value) associated the junction node 104-4 (or a metering device associated therewith) and a sum of values (e.g., a sum of utility usage values) associated with the nodes (or metering devices associated therewith) included in the topology at a particular time or over a predetermined period of time. If no change in the utility usage of the junction node 104-4 or any node included in the topology is unattributable or no difference exists, the monitoring module 218 may determine that no fraud or leakage occur in the network.

Alternatively, in response to detecting or determining that a usage value change in a node (e.g., the node 104-1) of the nodes included in the topology is unattributable by any usage value change of the junction node 104-4, the monitoring module 218 may determine that a fraud associated with that particular node 104-1 (e.g., tampering a metering device 106-1 associated with the node 104-1) is committed. Additionally or alternatively, the monitoring module 218 may determine that a fraud (e.g., bypassing the metering device 106-1 associated with the node 104-1) and/or a leakage between the node 104-1 and the junction node 104-4 occurs.

In some implementations, in response to determining that one or more changes in the usage value of the junction node 104-4 are unattributable by any combination of one or more changes in utility usage values of the nodes 104 included in the topology, the monitoring module 218 may determine that a fraud (e.g., bypassing a metering device 106-1 associated with a node 104-1 included in the topology) may exist in the part of the distribution network associated with the junction node 104-4. Additionally or alternatively, the monitoring module 218 may determine that a leakage between the node 104-1 and the junction node 104-4 occurs.

Additionally or alternatively, in one implementation, in response to determining that each change in the usage value of the nodes 104 included in the topology is attributable by changes in the usage value of the junction node 104-4 and one or more changes in the usage value of the junction node 104-4 are unattributable by any combination of one or more changes in utility usage values of the nodes 104 included in the topology, the monitoring module 218 may determine that a fraud (e.g., bypassing a metering device 106-1 associated with a node 104-1 included in the topology) may exist in the part of the distribution network associated with the junction node 104-4. Additionally or alternatively, the monitoring module 218 may determine that a leakage between the node 104-1 and the junction node 104-4 occurs.

Additionally or alternatively, in some implementations, in response to determining that detecting that each change in the usage value associated with the junction node 104-4 is attributable by a combination of one or more changes in the usage values associated with one or more of the nodes 104 included in the topology and a difference exists between a usage value associated with the junction device 104-4 and a sum of usage values associated with the nodes 104 included in the topology at a particular time or over a predetermined period of time, the monitoring module 218 may determine that a leakage between a node (e.g., the node 104-1) and the junction node 104-4 occurs.

In response to detecting a fraud and/or a leakage in the distribution network, the network topology detection and fraud detection system 102 may include an output module 220 to notify a relevant person such as a system administrator or personnel of the central office 108, for example, to follow up on this detection of the fraud and/or the leakage, and fix the fraud and/or the leakage in the distribution network.

Alternative Implementations

Although the foregoing implementations describe determining a topology of a part or subset of a distribution network having a given node as a root node of the part or subset of the distribution network, the present disclosure is not limited thereto. In one implementation, a topology of a network including a given node (e.g., the customer node 104-2, etc.) to be determined may alternatively include an upstream topology associated with the given node 104-2 that includes a network of the given node 104-2 and a junction node (e.g., the junction node 104-4) through which the utility service is delivered to the given node 104-2.

In some implementations, a topology of a network including a given node (e.g., the customer node 104-2, etc.) to be determined may alternatively include a coverage topology that includes a part of the distribution network of the utility service including the given node 104-2, a junction node (e.g., the junction node 104-4) through which the utility service is delivered to the given node 104-2 and other nodes of the distribution network to which the utility service is delivered via the junction node 104-4, for example.

In one implementation, the network topology detection and fraud detection system 102 may determine which type of topology an instruction or a request is interested in based on, for example, a type of node of the distribution network for which the topology is to be determined. By way of example and not limitation, the network topology detection and fraud detection system 102 may determine that a downstream topology is to be determined for a node, such as a junction node or substation node, that includes child nodes in the distribution network of the utility service. In some implementations, the network topology detection and fraud detection system 102 may determine that an upstream or coverage topology is to be determined for a node, such as a customer node, that includes no child node in the distribution network of the utility service.

Additionally or alternatively, the network topology detection and fraud detection system 102 may determine which type of topology an instruction or a request is interested in based on, for example, information in the instruction or the request received. For example, the instruction or the request may be received from the central office 108 (or other management or query system), and include information about which type of the topologies the central office 108 (or other management or query system) is interested in. Additionally or alternatively, in some implementations, the network topology detection and fraud detection system 102 may determine a topology of part or all of the distribution network based on an instruction or request from the central office 108 (or other management or query system).

In some implementations, in order to accommodate latencies between nodes with respect to utility usage information (e.g., a change in water usage at node 104-1 may not be instantaneously reflected at node 104-4, etc.), the network topology detection and fraud detection system 102 may employ a sliding window in computing correlations of usage values or changes in usage values between two nodes (e.g., a given node and a considered node, etc.) over one or more periods of time. By using a sliding window, the network topology detection and fraud detection system 102 may tolerate mismatching of utility usage values or value changes between two nodes due to latency (e.g., because of a distance between the two nodes, etc.), and therefore reduce the likelihood of obtaining false negatives in network topology detection.

Exemplary Methods

Figure 3:
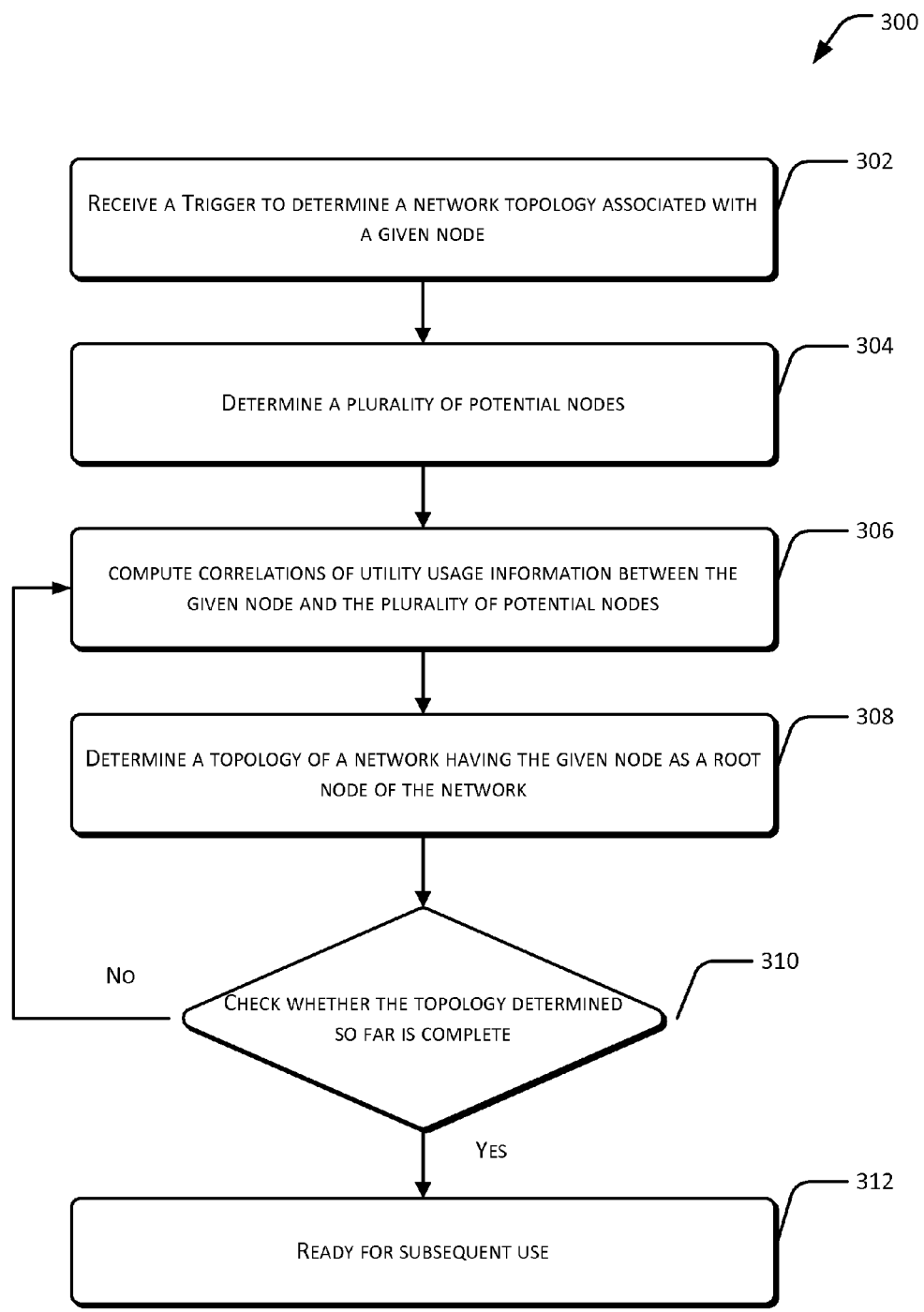
FIG. 3 illustrates an example method of network topology detection.
Figure 4:
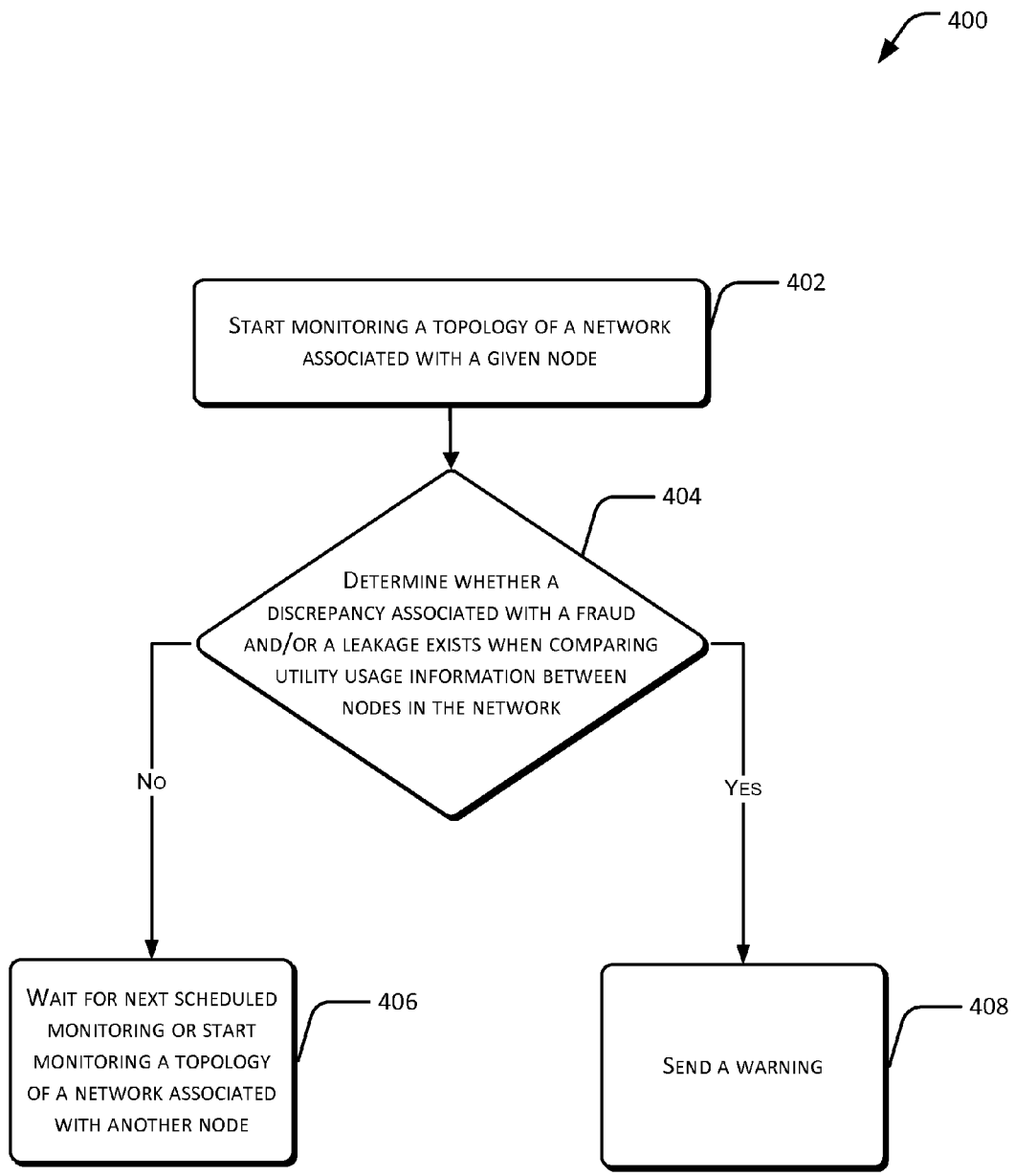
FIG. 4 illustrates an example method of fraud detection.

FIG. 3 is a flow chart depicting an example method 300 of network topology detection. FIG. 4 is a flow chart depicting an example method 400 of fraud detection. The methods of FIG. 3 and FIG. 4 may, but need not, be implemented in the environment of FIG. 1 and using the system of FIG. 2. For ease of explanation, methods 300 and 400 are described with reference to FIGS. 1-2. However, the methods 300 and 400 may alternatively be implemented in other environments and/or using other systems.

Methods 300 and 400 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 3, at block 302, the network topology detection and fraud detection system 102 may be triggered to determine a topology of a part of a utility service distribution network including a given node as a root node. In one implementation, the network topology detection and fraud detection system 102 may receive an instruction or a request to determine a topology of a part of a utility service distribution network including a given node as a root node. Additionally or alternatively, the network topology detection and fraud detection system 102 may determine a topology of a part of a utility service distribution network including a given node as a root node on a regular basis. Additionally or alternatively, the network topology detection and fraud detection system 102 may be triggered by an event to determine a topology of a part of a utility service distribution network. For example, the network topology detection and fraud detection system 102 may detect abnormal activities or readings (such as significant changes in utility service consumption, for example) in a given node and may be triggered to determine a topology of a part of a utility service distribution network including the given node as a root node of the topology to be determined.

At block 304, in response to receiving a given node, the network topology detection and fraud detection system 102 may determine a plurality of nodes of the utility service distribution network that are potentially parts of the topology associated with the given node to be determined. The network topology detection and fraud detection system 102 may determine the plurality of potential nodes based on information such as associated physical locations, associated communication networks, and/or associated grids of the distribution network, for example.

At block 306, upon determining a plurality of potential nodes to be considered, the network topology detection and fraud detection system 102 may determine which one or more potential nodes belong to the topology to be determined based on correlations between utility usages (or changes in the utility usages) of respective potential nodes and utility usage (or changes in the utility usage) of the given node.

At block 308, the network topology detection and fraud detection system 102 may compare the correlations between the plurality of potential nodes and the given node to a predetermined correlation threshold. In one implementation, if a correlation between a potential node and the given node is greater than or equal to a predetermined correlation threshold, the network topology detection and fraud detection system 102 may render the potential node to be a part of the topology to be determined.

At block 310, upon determining one or more potential nodes to be parts of the topology to be determined, the network topology detection and fraud detection system 102 may determine whether the topology determined so far is complete. The network topology detection and fraud detection system 102 may determine whether the topology is determined so far complete based on, for example, whether a difference exists between the utility usage (or changes in the utility usage) of the given node and a sum of the utility usages (or changes in the utility usages) of the one or more determined nodes. If a difference exists, the network topology detection and fraud detection system 102 may determine that the topology determined so far is incomplete. The network topology detection and fraud detection system 102 may then repeat the operations of topology determination with a larger scope of consideration, for example, by considering additional nodes in other communication networks, physical locations and/or grids of the distribution network that have not been considered previously.

At block 312, if no difference exists, the network topology detection and fraud detection system 102 may determine that the topology determined so far is complete. The network topology detection and fraud detection system 102 may make available of the determined topology associated with the given node for subsequent use such as fraud detection.

Referring back to FIG. 4, at block 402, given a previously determined or known topology of a network associated with a given node (with the given node being a root node of the network), the network topology detection and fraud detection system 102 may monitor and/or detect frauds and/or leakages in the network on a regular basis and/or upon request, for example, by the central office 108 or a maintenance personnel.

At block 404, the network topology detection and fraud detection system 102 may determine whether a fraud and/or a leakage may exist in the network by determining whether a discrepancy exists between utility usage information, such as changes in utility usage values, for example, of the given nodes and a plurality of nodes branching from the given node in the network.

At block 406, if no discrepancy exists, the network topology detection and fraud detection system 102 may determine that no fraud and leakage exist in the network. The network topology detection and fraud detection system 102 may wait for a next scheduled monitoring time for this given node. Additionally or alternatively, the network topology detection and fraud detection system 102 may shift to another node of the distribution network and determine whether a fraud and/or a leakage exists in a topology of a network associated with another node.

At block 408, if a discrepancy exists, the network topology detection and fraud detection system 102 may determine that a fraud and/or a leakage exist(s) in the network. In response to determining or detecting a fraud and/or a leakage exist(s) in the network, the network topology detection and fraud detection system 102 may send a warning or alert to the central office 108 or the maintenance personnel for follow-up or field investigation to fix the fraud and/or the leakage in the network.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
under control of a processing unit programmed to perform:
receiving and storing one or more values indicating utility consumption data reported from one or more utility metering nodes of a network;
detecting one or more significant changes associated with the one or more values indicating utility consumption data;
in response to detecting the one or more significant changes, selecting a utility metering node of the one or more utility metering nodes for which a portion of a physical power distribution topology is undetermined;
identifying a plurality of nodes potentially connected to the selected utility metering node based, at least in part, on location information or communication network information of the plurality of nodes;
correlating, from the stored values of the selected utility metering node, value changes indicating a change in amount of utility consumption associated with the selected utility metering node and value changes indicating a change in amount of utility consumption associated with the plurality of nodes with respect to a physical quantity and storing the correlating in a memory; and
determining, for the selected utility metering node, the previously undetermined portion of the physical power distribution topology of the network comprising the selected utility metering node and at least some nodes of the plurality of nodes based at least on the correlating of value changes that indicate the change in amount of utility consumption associated with the selected utility metering node and the value changes indicating the change in amount of utility consumption associated with the plurality of nodes.

2. The method as recited in claim 1, wherein the plurality of nodes comprises electricity meters, and the physical quantity comprises a usage of an electrical current, an electrical voltage or an electrical power.

3. The method as recited in claim 1, wherein:
the plurality of nodes comprises gas meters, and the physical quantity comprises a volume of gas usage; or
the plurality of nodes comprises water meters, and the physical quantity comprises a volume of water usage.

4. The method as recited in claim 1, further comprising receiving records of respective value changes from the plurality of nodes.

5. The method as recited in claim 1, wherein each of the at least some nodes is determined to be part of the topology based on a computed correlation of value changes between the respective node and the selected node being greater than or equal to a correlation threshold.

6. The method of claim 1, further comprising:
  determining that at least one node is missing from the undetermined portion of the physical power distribution topology;
  identifying a second plurality of nodes potentially connected to the selected utility metering node; and
  identifying the at least one node that was missing based at least on an amount of utility consumption associated with the at least one node.

7. The method as recited in claim 1, further comprising determining whether a discrepancy exists in value information among the one or more nodes in the network based on the determined topology, the discrepancy comprising a discrepancy due to a fraud and/or a leakage in the network.

8. The method as recited in claim 7, wherein the determining comprises at least one of:
  determining whether a value change associated with the selected utility metering node is attributable to a combination of one or more value changes associated with one or more of the at least some nodes, or
  determining whether a difference exists between a value associated with the selected utility metering node and a sum of values associated with the at least some nodes with respect to the physical quantity at a particular time.

9. The method as recited in claim 7, further comprising detecting that a discrepancy exists in the value information among the one or more nodes in the network based on the determined topology.

10. The method as recited in claim 9, wherein the determining comprises:
  detecting that a value change associated with a node of the at least some nodes is unattributable by any value change associated with the selected utility metering node; and
  determining that a fraud associated with the node of the at least some nodes has been committed.

11. The method as recited in claim 9, wherein the detecting comprises:
  detecting that each value change associated with the at least some nodes is attributable by a value change associated with the selected utility metering node; and
  determining that a fraud bypassing a node of the at least some nodes and/or a leakage exist(s) in the network.

12. The method as recited in claim 9, wherein the detecting further comprises:
  detecting that one or more value changes associated with the selected utility metering node are unattributable by any combination of one or more value change associated with the at least some nodes; and
  determining that a fraud bypassing a node of the at least some nodes exists in the network.

13. The method as recited in claim 9, wherein the detecting further comprises:
  detecting that each value change associated with the selected utility metering node is attributable by a combination of one or more value changes associated with one or more of the at least some nodes; and
  determining that a leakage exists in the network.

14. The method as recited in claim 13, wherein the detecting further comprises detecting that a difference exists between a value associated with the selected utility metering node and a sum of values associated with the at least some nodes with respect to the physical quantity at a particular time.

15. A system comprising:
  a processing unit configured to perform acts comprising:
    receiving and storing one or more values indicating utility consumption data reported from one or more utility metering nodes of a network;
    detecting one or more significant changes associated with the one or more values indicating utility consumption data;
    in response to the detecting, selecting a node of the one or more utility metering nodes for which a portion of a physical power distribution topology is undetermined;
    identifying a plurality of nodes potentially connected to the selected node based, at least in part, on location information of the plurality of nodes and location information of the selected node;
    determining the previously undetermined portion of the physical power distribution topology of the network comprising the selected node and the plurality of nodes based on a correlation or relationship between amount of resource consumption at the selected node and amount of resource consumption at the plurality of nodes;
    determining, based at least in part on the topology, whether a value change indicating a change in amount of resource consumption associated with the selected node with respect to a physical quantity is attributable to a combination of one or more value changes indicating a change in amount of resource consumption associated with one or more of the plurality of nodes; and
    detecting whether a discrepancy exists in the network comprising the selected node and the plurality of nodes based at least in part on whether the value change associated with the selected node is attributable to the combination of one or more value changes associated with one or more of the plurality of nodes.

16. The system as recited in claim 15, wherein the plurality of nodes comprise electricity meters, gas meters or water meters, and wherein the physical quantity comprises an electrical current, an electrical voltage, an electrical power, a volume of gas usage or a volume of water usage.

17. The system as recited in claim 15, wherein the determining whether the value change associated with the selected node is attributable to the combination of one or more value changes associated with one or more of the plurality of nodes further comprises determining whether a difference exists between a value associated with the selected node and a sum of values associated with the plurality of nodes with respect to the physical quantity at a particular time.

18. The system as recited in claim 17, wherein the determining whether the value change associated with the selected node is attributable to the combination of one or more value changes associated with one or more of the plurality of nodes further comprises determining whether a value change associated with a node of the plurality of nodes is attributable to any value change associated with the selected node within a sliding time window of a time associated with the value change associated with the node of the plurality of nodes.

19. The system as recited in claim 15, the acts further comprising:

detecting that one or more value changes associated with the selected node are unattributable to any combination of one or more value change associated with the plurality of nodes; and determining that a fraud bypassing a node of the plurality of nodes and/or a leakage exists in the network based at least in part on the detecting that the one or more value changes associated with the selected node are unattributable to any combination of one or more value change associated with the plurality of nodes.

20. One or more non-transitory computer readable media storing executable instructions that, when executed by a processing unit, configure the processing unit to perform acts comprising:

receiving and storing one or more values indicating utility consumption data reported from one or more utility metering nodes of a network;

detecting one or more significant chances associated with the one or more values indicating utility consumption data;

in response to the detecting, selecting a node of the one or more utility metering nodes for which a portion of a physical power distribution topology is unknown;

identifying a plurality of nodes potentially connected to the selected node based, at least in part, on communication network information of the plurality of nodes and communication information of the selected node;

determining, for the selected node, the previously unknown portion of the physical power distribution topology of the network comprising at least some of the plurality of nodes and the selected node, based at least on correlating respective value changes indicating changes in amount of utility consumption associated with the plurality of nodes to value changes indicating changes in amount of utility consumption associated with the selected node with respect to a physical quantity;

determining if the determined topology is a complete topology based, at least in part, on comparing a sum of resource consumption information recorded at the plurality of nodes to resource consumption information recorded at the selected node, based on the determining if the determined topology is a complete topology, identifying an additional node potentially connected to the selected node and determining if the additional node is connected to the selected node based, at least in part, on correlating respective value changes indicating changes in amount of utility consumption associated with the additional node to value changes indicating changes in amount of utility consumption associated with the selected node with respect to a physical quantity; and determining whether a discrepancy exists in the network based on the determined topology, the discrepancy comprising a discrepancy due to a fraud and/or a leakage in the network, the determining comprising:

determining whether a difference exists between a value associated with the selected node and a sum of values associated with the plurality of nodes with respect to the physical quantity at a particular time, and determining whether a value change associated with the selected node is attributable to a combination of one or more value changes associated with one or more of the plurality of nodes.

* * * * *

UNITED STATES PATENT AND TRADEMARK OFFICE
CERTIFICATE OF CORRECTION

PATENT NO. : 9,924,242 B2
APPLICATION NO. : 13/560078
DATED : March 20, 2018
INVENTOR(S) : Van Wyk Page 1 of 5

It is certified that error appears in the above-identified patent and that said Letters Patent is hereby corrected as shown below:

In the Claims

Replace Column 16, Line 15, through Column 20, Line 32, with:
-- 1. A method comprising:
detecting, by a first utility metering node, one or more significant changes associated with one or more values indicating utility consumption data; and
in response to detecting the one or more significant changes, triggering the first utility metering node to determine a physical power distribution topology of at least a portion of a utility network of which the utility metering node is a part, wherein determining the physical power distribution topology comprises:
    determining, at the first utility metering node, that the first utility metering node is a root node of at least a portion of the physical power distribution topology of the utility network;
identifying, at the first utility metering node, one or more utility metering nodes potentially connected to the first utility metering node based, at least in part, on location information or communication network information between the first utility metering node and the one or more utility metering nodes;
correlating, by the first utility metering node and from one or more stored values of the first utility metering node, value changes indicating a change in amount of utility consumption associated with the first utility metering node and value changes indicating a change in amount of utility consumption associated with the one or more utility metering nodes with respect to a physical quantity; and
determining, at the first utility metering node and for the first utility metering node, a previously undetermined portion of the physical power distribution topology of the utility network comprising the first utility metering node and at least one node of the one or more utility metering nodes based at least in part on the correlating of value changes that indicate the change in amount of utility consumption associated with the first utility metering node and the value changes indicating the change in amount of utility consumption associated with the one or more utility metering nodes.

Signed and Sealed this
Second Day of October, 2018

Andrei Iancu
*Director of the United States Patent and Trademark Office*

2. The method as recited in claim 1, wherein the first utility metering node comprises an electricity meter, and the physical quantity comprises a usage of an electrical current, an electrical voltage or an electrical power.

3. The method as recited in claim 1, wherein:
the first utility metering node comprises a gas meter, and the physical quantity comprises a volume of gas usage; or
the first utility metering node comprises a water meter, and the physical quantity comprises a volume of water usage.

4. The method as recited in claim 1, further comprising receiving records of respective value changes from the one or more utility metering nodes.

5. The method as recited in claim 1, further comprising determining whether a discrepancy exists in value information among one or more utility metering nodes in the utility network based on the determined topology, the discrepancy comprising a discrepancy due to a fraud and/or a leakage in the utility network.

6. The method as recited in claim 5, wherein the determining comprises at least one of:
determining whether a value change associated with the first utility metering node is attributable to a combination of one or more value changes associated with at least one of the one or more utility metering nodes, or
determining whether a difference exists between a value associated with the first utility metering node and a sum of values associated with the one or more utility metering nodes with respect to the physical quantity at a particular time.

7. The method as recited in claim 5, further comprising detecting that a discrepancy exists in the value information among the one or more utility metering nodes in the utility network based on the determined topology.

8. The method as recited in claim 7, wherein the determining comprises:
detecting that a value change associated with a node of the one or more utility metering nodes is unattributable to any value change associated with the first utility metering node; and
determining that a fraud associated with the node of the one or more utility metering nodes has been committed.

9. The method as recited in claim 7, wherein the detecting comprises:
detecting that each value change associated with the one or more utility metering nodes is attributable to a value change associated with the first utility metering node; and
determining that a fraud bypassing the first utility metering node of the utility network and/or a leakage exist(s) in the utility network.

10. The method as recited in claim 7, wherein the detecting further comprises:
detecting that one or more value changes associated with the first utility metering node are unattributable to any combination of one or more value changes associated with the one or more utility metering nodes; and determining that a fraud bypassing a node of the one or more utility metering nodes exists in the utility network.

11. The method as recited in claim 7, wherein the detecting further comprises:
detecting that each value change associated with the first utility metering node is attributable to a combination of one or more value changes associated with the one or more utility metering nodes; and
determining that a leakage exists in the utility network.

12. The method as recited in claim 11, wherein the detecting further comprises detecting that a difference exists between a value associated with the first utility metering node and a sum of values associated with the at least one of the one or more utility metering nodes with respect to the physical quantity at a particular time.

13. The method as recited in claim 11, wherein each of the one or more utility metering nodes is determined to be part of the topology based on a computed correlation of value changes between the respective node and the first utility metering node being greater than or equal to a correlation threshold.

14. The method of claim 11, further comprising:
determining that at least one node of the one or more utility metering nodes is missing from the undetermined portion of the physical power distribution topology;
identifying one or more additional utility metering nodes potentially connected to the first utility metering node; and
identifying the at least one node of the one or more utility metering nodes that was missing based at least on an amount of utility consumption associated with the at least one node.

15. The method of claim 11, further comprising:
communicating the previously undetermined portion of the physical power distribution topology to one or more other utility metering nodes in the power distribution topology of the utility network.

16. A system comprising:
a processing unit configured to perform acts comprising:
    determining, at a first utility metering node of a network, that the first utility metering node is a root node of at least a portion of a physical power distribution topology;
identifying, at the first utility metering node, one or more utility metering nodes potentially connected to the first utility node based, at least in part, on location information of one or more utility metering nodes and location information of the first utility node;
determining, at the first utility metering node, a previously undetermined portion of the physical power distribution topology of the utility network comprising the first utility node and the one or more utility metering nodes based on a correlation or relationship between amount of resource consumption at the first utility node and amount of resource consumption at the one or more utility metering nodes;
determining, based at least in part on the physical power distribution topology, whether a value change indicating a change in amount of resource consumption associated with the first utility node with respect to a physical quantity is attributable to a combination of one or more value changes indicating a change in amount of resource consumption associated with one or more utility metering nodes; and detecting whether a discrepancy exists in the network comprising the first utility node and the one or more utility metering nodes based at least in part on whether the value change associated with the first utility node is attributable to the combination of one or more value changes associated with one or more utility metering nodes.

17. The system as recited in claim 16, wherein the one or more utility metering nodes comprise electricity meters, gas meters or water meters, and wherein the physical quantity comprises an electrical current, an electrical voltage, an electrical power, a volume of gas usage or a volume of water usage.

18. The system as recited in claim 16, wherein the determining whether the value change associated with the first utility node is attributable to the combination of one or more value changes associated with the one or more utility metering nodes further comprises determining whether a difference exists between a value associated with the first utility node and a sum of values associated with the one or more utility metering nodes with respect to the physical quantity at a particular time.

19. The system as recited in claim 18, wherein the determining whether the value change associated with the first utility node is attributable to the combination of one or more value changes associated with the one or more utility metering nodes further comprises determining whether a value change associated with a node of the one or more utility metering nodes is attributable to any value change associated with the first utility node within a sliding time window of a time associated with the value change associated with the node of the one or more utility metering nodes.

20. The system as recited in claim 16, the acts further comprising:
detecting that one or more value changes associated with the first utility node are unattributable to any combination of one or more value change associated with the one or more utility metering nodes; and determining that a fraud bypassing a node of the one or more utility metering nodes and/or a leakage exists in the utility network based at least in part on the detecting that the one or more value changes associated with the first utility node are unattributable to any combination of one or more value changes associated with the one or more utility metering nodes.

21. One or more non-transitory computer readable media storing executable instructions that, when executed by a processing unit, configure the processing unit to perform acts comprising:
    determining, at a first utility metering node of a utility network that the first utility metering node is a root node of at least a portion of a physical power distribution topology of the utility network;
identifying, at the first utility metering node, one or more utility metering nodes potentially connected to the first utility node based, at least in part, on communication network information between the first utility metering node and the one or more utility metering nodes;
determining, at the first utility metering node and for the first utility node, a previously unknown portion of the physical power distribution topology of the utility network comprising the first utility node and the one or more utility metering nodes, based at least in part on correlating respective value changes indicating changes in amount of utility consumption associated with the one or more utility metering nodes to value changes indicating changes in amount of utility consumption associated with the first utility node with respect to a physical quantity;
determining if the determined topology is a complete topology based, at least in part, on comparing a sum of resource consumption information recorded at the one or more utility metering nodes to resource consumption information recorded at the first utility node;

based on the determining if the determined topology is a complete topology, identifying an additional node potentially connected to the first utility node and determining if the additional node is connected to the first utility node based, at least in part, on correlating respective value changes indicating changes in amount of utility consumption associated with the additional node to value changes indicating changes in amount of utility consumption associated with the first utility node with respect to a physical quantity; and determining whether a discrepancy exists in the network based on the determined topology, the discrepancy comprising a discrepancy due to a fraud and/or a leakage in the network, the determining comprising:

determining whether a difference exists between a value associated with the first utility node and a sum of values associated with the one or more utility metering nodes and the additional node with respect to the physical quantity at a particular time, and determining whether a value change associated with the first utility node is attributable to a combination of one or more value changes associated with the one or more utility metering nodes or the additional node. --